(12) United States Patent
Plazinskiy et al.

(10) Patent No.: US 10,075,485 B2
(45) Date of Patent: Sep. 11, 2018

(54) ANIMATED SNAPSHOTS

(71) Applicant: NBCUniversal Media, LLC, New York, NY (US)

(72) Inventors: Vladislav Plazinskiy, Englewood Cliffs, NJ (US); Michael Ibrahim, Englewood Cliffs, NJ (US); Matthew DuLeone, Englewood Cliffs, NJ (US); Theodore Ortega, Englewood Cliffs, NJ (US); Arturo Vermolen, New York, NY (US)

(73) Assignee: NBCUniversal Media LLC, New York, NY (US)

( * ) Notice: Subject to any disclaimer, the term of this patent is extended or adjusted under 35 U.S.C. 154(b) by 400 days.

(21) Appl. No.: 14/750,816

(22) Filed: Jun. 25, 2015

(65) Prior Publication Data
US 2016/0381090 A1    Dec. 29, 2016

(51) Int. Cl.
*G06F 3/00* (2006.01)
*H04L 29/06* (2006.01)

(52) U.S. Cl.
CPC ................... *H04L 65/403* (2013.01)

(58) Field of Classification Search
None
See application file for complete search history.

(56) References Cited

U.S. PATENT DOCUMENTS

| | | | |
|---|---|---|---|
| 9,680,898 B2 * | 6/2017 | Plumley | H04L 65/604 |
| 2007/0168543 A1 * | 7/2007 | Krikorian | G11B 27/034 |
| | | | 709/231 |
| 2009/0010485 A1 * | 1/2009 | Lamb | H04N 7/147 |
| | | | 382/100 |
| 2015/0373281 A1 * | 12/2015 | White | G06F 3/0482 |
| | | | 348/660 |

* cited by examiner

*Primary Examiner* — Thanh Vu
(74) *Attorney, Agent, or Firm* — Fletcher Yoder, P.C.

(57) ABSTRACT

Current embodiments relate to generation/sharing of a snapshot of content that the user is viewing. Upon generation of a request for a snapshot of currently viewed content, the snapshot may be generated based at least in part upon one or more parameters and/or criteria included in the request and/or service generating the snapshot. Upon completion of the snapshot, a response that provides the snapshot or a location where the snapshot may be viewed is provided, such that the snapshot may be provided to particular sharing targets, such as social media platforms, electronic devices, email, etc.

21 Claims, 10 Drawing Sheets

ANIMATED SNAPSHOTS

BACKGROUND

The present disclosure relates generally to digital content consumption, and, more particularly, to streamlined generation and sharing of snapshots of digital content (e.g., via the Internet).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The world is becoming increasingly connected via digital networks and infrastructure. The Internet has given rise to many social media platforms that enable users to provide comments on particular products, "like" particular products, and/or suggest products that one or more friends might like. Accordingly, these social media platforms are becoming an increasingly useful avenue for advertisement and driving traffic to particular products and/or digital content. Unfortunately, the viewing experience associated with broadcast content (e.g., over-the-air, cable, video on demand service, and/or satellite television) has traditionally been a closed ecosystem that makes it difficult to share content to these social media platforms. Traditional broadcast tuning hardware does not provide effective and/or efficient way to share content on digital networks.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

Generally speaking, the current embodiments relate to systems where a user may indicate a desire to generate and share a snapshot of content that the user is viewing. For example, a user may provide an indication by selecting an option on a remote control that is associated with a set top box that is rendering content on a television. Upon receiving this indication, the electronic device may provide a request for generation of a snapshot to one or more snapshot generation servers. The snapshot servers may generate the snapshot based at least in part upon one or more parameters and/or criteria included in the request and/or stored at the snapshot servers. Upon completion of the snapshot, the snapshot servers may provide a response that provides the snapshot or a location where the snapshot may be viewed. The electronic device may provide one or more user prompts for sharing the snapshot and/or submit a post of the snapshot to one or more social media platforms. Accordingly, users may quickly and easily generate and share snapshots of digital content to one or more social media platforms, resulting in increased awareness of those connected to the user's social media pages.

DRAWINGS

These and other features, aspects, and advantages of the present disclosure will become better understood when the following detailed description is read with reference to the accompanying drawings in which like characters represent like parts throughout the drawings, wherein:

FIG. 7 illustrates a basic flow of snapshot generation and sharing, without associated constraints, in accordance with certain embodiments;

FIG. 8 illustrates spoiler alert handling and banned target constraints, in accordance with certain embodiments;

FIG. 9 illustrates a snapshot of a commercial being generated, shared, incentivized and tracked, in accordance with certain embodiments;

Figure 10:
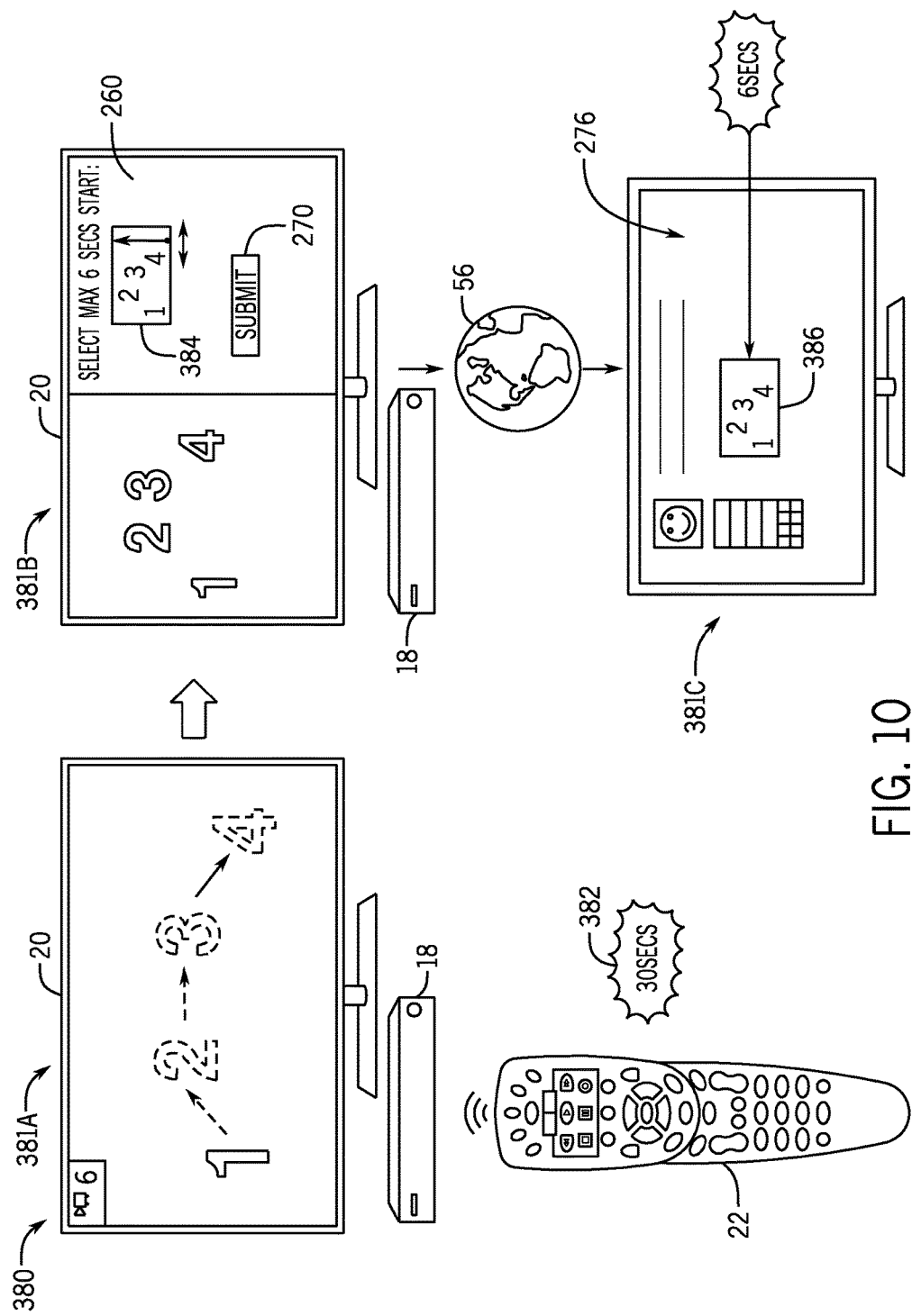
Figure 11:
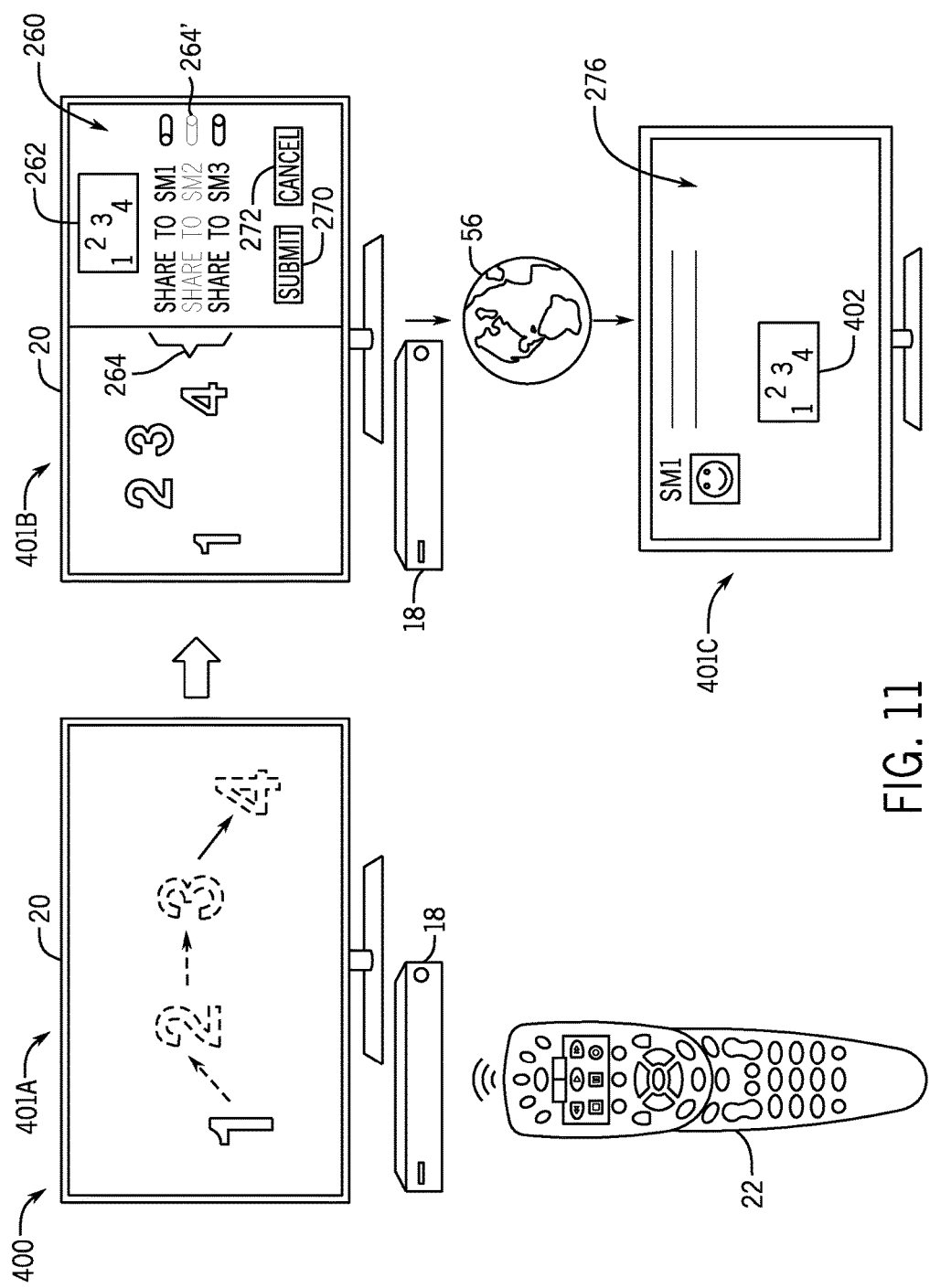

FIG. 10 the application of maximum timing constraints, in accordance with certain embodiments; and FIG. 11 illustrates exclusive target constraints being applied, in accordance with certain embodiments.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "entity" refers to a user of one or more technology resources, such as: an employee, customer, contractor, or partner, or a computer system, web service, or the like. In some scenarios, "entity" may refer to a group or subset of users of one or more technology resources. Also, the term "technology resources" refers to technology related systems (e.g., software applications, databases, networks, file directories, feeds, and so forth). Provisioning refers to providing entities (e.g., users, clients, and/or customers) with access to data and/or technology resources and de-provisioning refers to removing and/or disabling entity (e.g., user, client, and/or customer) access to data and/or technology resources.

As previously mentioned, there exists an opportunity to more easily and/or efficiently create and share snapshots of content sourced from closed ecosystems (e.g., broadcast television systems) on social media platforms. By reducing the complexity in providing these snapshot sharing services, users may be encouraged to promote broadcasters and/or other vendors' products and/or content. Accordingly, traffic may be driven to these products and/or content, resulting in increased revenues for the broadcasters and/or other vendors.

Figure 1:
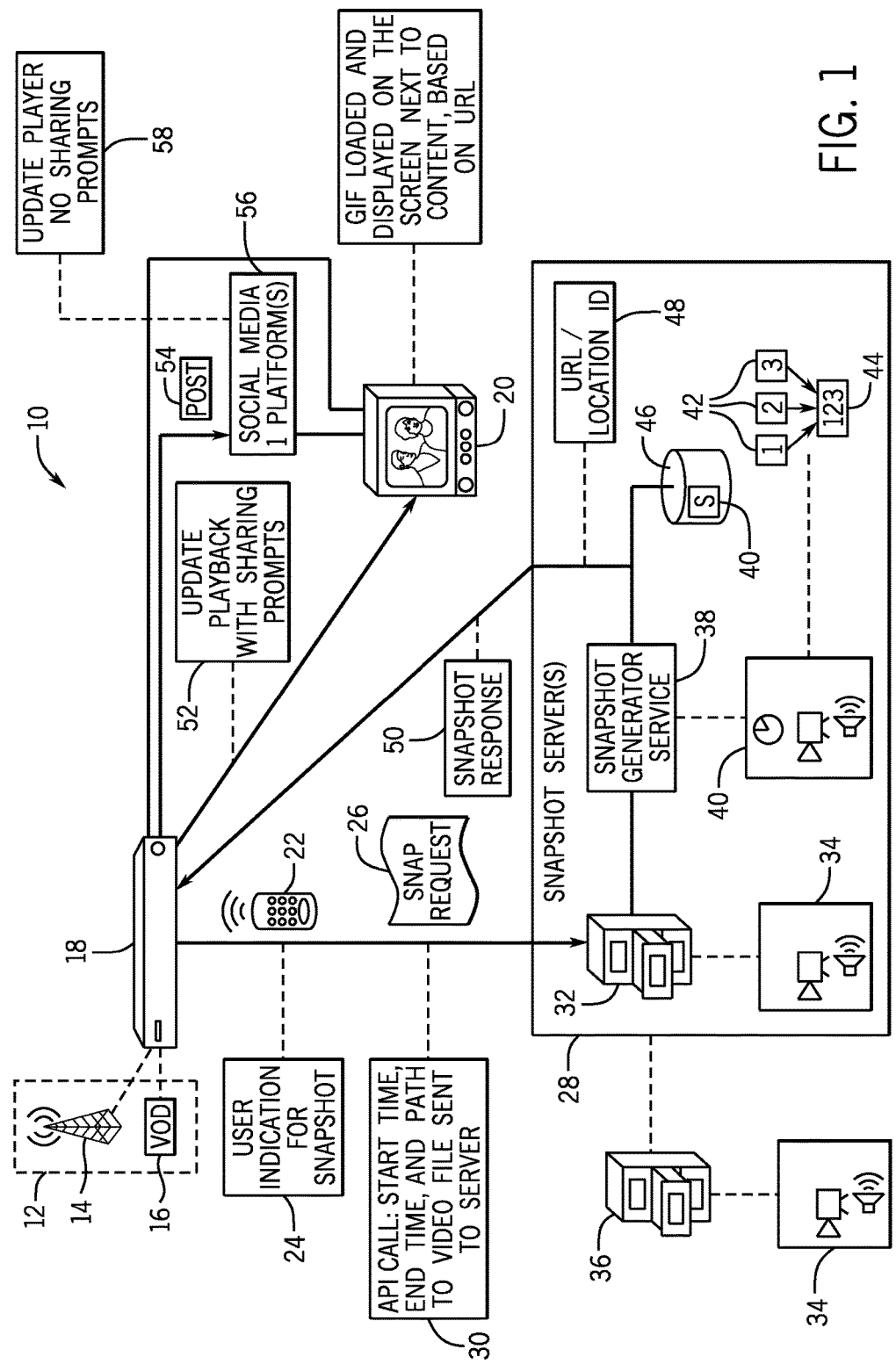
FIG. 1 is a schematic view of a snapshot provision and sharing system, in accordance with certain embodiments.

Turning now to a more detailed discussion of the snapshot sharing system, FIG. 1 is a schematic view of a snapshot provision and sharing system 10, in accordance with certain embodiments. As mentioned above, a content provider 12 (e.g., broadcaster 14 and/or video-on-demand provider 16) may provide primary content (e.g., digital content) to a user via content tuning/receiving hardware 18 (e.g., a set-top box). Upon receipt (or in a time-lapse (e.g., facilitated by digital video recording (DVR) hardware)), the content may be presented to the user (e.g., via a television and/or display 20 or other content playback device). In some embodiments, the content provider 12 may provide the primary content via one or more cloud computing services.

In some embodiments, the tuning/receiving hardware 18 may include the playback hardware (e.g., display 20). For example, the tuning/receiving hardware 18 may be a smart television that has network communication capabilities or may be a computer system, tablet computer, or other processing device that incorporates a display 20.

From time to time, the user may desire to share a snapshot of the digital content to one or more others. For example, the user may find a particular clip (e.g., segment, skit, monologue, etc.) to be entertaining and may want to share the clip with others that may find the clip entertaining Using the system 10, the user may easily generate and/or share a snapshot of a portion of the content with others via one or more social media platforms. To do this, the user may initiate a function of the content tuning/receiving hardware 18 (or an independent snapshot capture and/or sharing device) by using one or more user input devices 22 (e.g., a remote control). For example, one or more inputs on the user input device 22 may provide an indication 24 that the user desires to capture and/or share a snapshot of the currently playing content.

Based upon this indication 24, the content tuning/receiving hardware 18 (or an independent snapshot capture and/or sharing device) may provide a snapshot request 26 to one or more snapshot servers and/or services 28. For example, in one embodiment, the snapshot servers and/or services 28 may host an application programming interface (API) and the snapshot request 26 may include an API call 30 to the API of the snapshot servers and/or services 28. For example, the API call 30 may include a start time, end time, content path, and/or other information useful for generating and/or sharing snapshots. For example, in some embodiments, the snapshot request 26 and/or API call 30 may include one or more constraints that should be followed when generating and/or sharing the snapshot.

The snapshot servers and/or services 28 may receive the snapshot request 26 and may access the content. For example, the snapshot servers and/or services 28 may include a local content library 32 that includes the primary content 34 and/or may access one or more external content libraries 36 and/or broadcasts to obtain the primary content 34. In some embodiments, the primary content 34 may be accessed directly from the content provider 12. For example, the primary content 34 may be accessed from the content provider 12 in parallel with the tuning/receiving hardware 18. Further, in some embodiments, the tuning/receiving hardware 18 may provide the primary content 34 to the snapshot servers and/or services 28.

Once the primary content 34 is accessed, a snapshot generator service 38 may generate a snapshot 40 of the primary content 34. For example, when dealing with video, the snapshot generator service 38 may segment the video into portable network graphics (PNG) files 42 and combine the PNG files into an animated graphics interchange format (GIF) file 44. Many other methods of generating a snapshot 40 may be used. Further, the primary content may be audio or other non-video content.

Once the snapshot 40 has been generated, the snapshot servers and/or services 28 may optionally store the snapshot 40 in internal and/or external data storage 46. In such embodiments, a universal resource locator (URL) or other location identifier 48 may be provided in a snapshot response message 50 to enable the content tuning/receiving hardware 18 (or an independent snapshot capture and/or sharing device) to access the snapshot 40. In some embodiments, the snapshot 40 may be directly provided to the content tuning/receiving hardware 18 (or an independent snapshot capture and/or sharing device) in the response message 50.

Upon receiving the snapshot 40 or the location identifier 48 the content tuning/receiving hardware 18 (or an independent snapshot capture and/or sharing device) may update 52 playback of the content with one or more sharing prompts. The sharing prompts may prompt the user for additional information useful for facilitating sharing of the snapshot. In certain embodiments, the prompts may include sharing confirmation, snapshot editing inputs, sharing destination prompts, etc. Further, in certain embodiments, a preview of the snapshot may be presented prior to actually sharing the snapshot.

Once the user provides sufficient inputs to the sharing prompts (e.g., confirms that the snapshot should be shared), the content tuning/receiving hardware 18 (or an independent snapshot capture and/or sharing device) may provide a POST command 54 to one or more social media platforms 56 and the content tuning/receiving hardware 18 (or an independent snapshot capture and/or sharing device) may update 58 playback to normal content presentation without the sharing prompts. Thus, users engaged with posts from the user's registered social media platforms 56 may become aware of the snapshot 40 that the user wished to share. Accordingly, additional traffic may be provided to the broadcaster 12's content and/or products associated with the content 40.

Snapshot Generation Request

Figure 2:
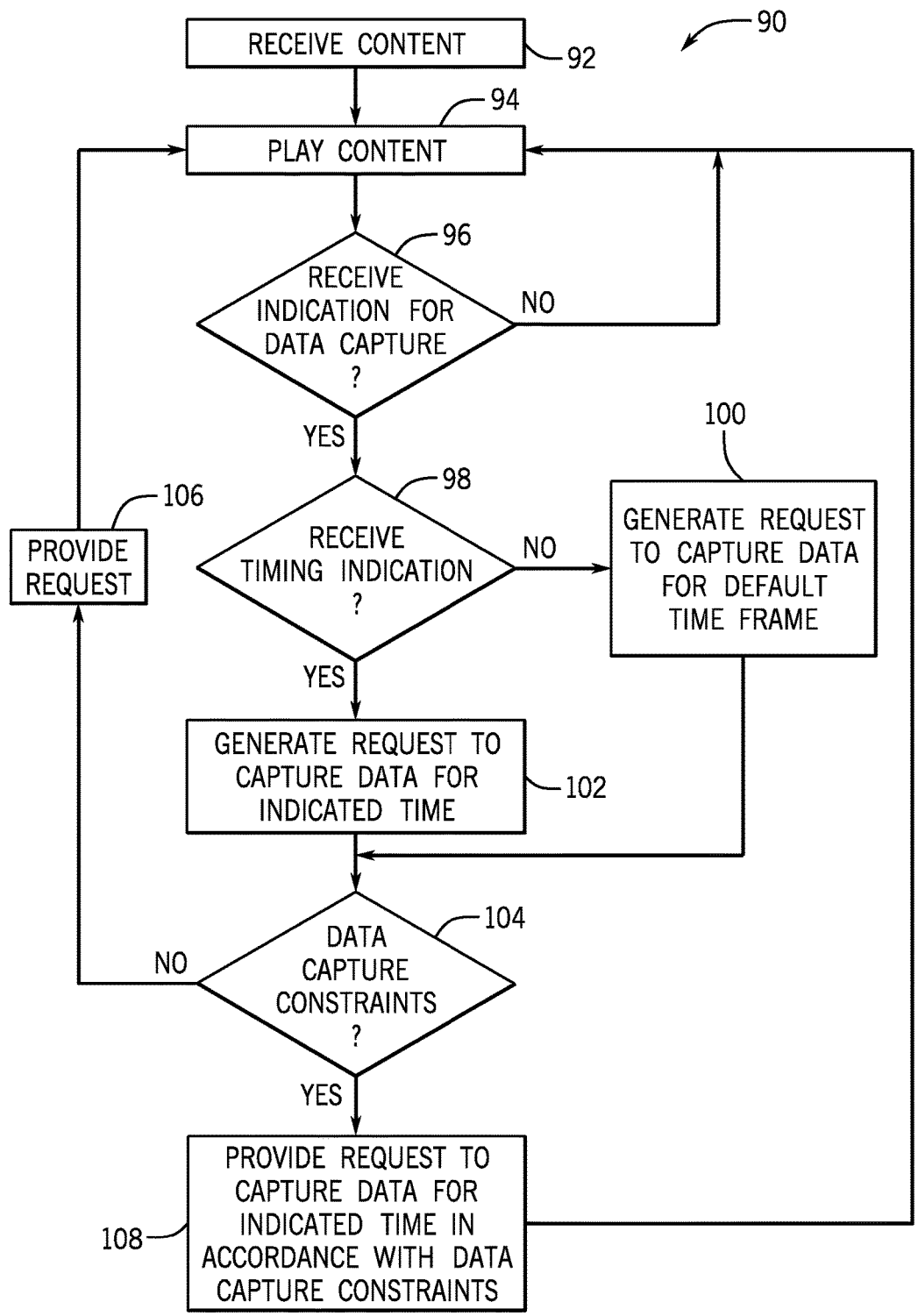
FIG. 2 is a flowchart illustrating generation of a snapshot request using the system of FIG. 1, in accordance with certain embodiments.

Turning now to particular functionalities of an electronic device that may initiate snapshot generation requests, FIG. 2 is a flowchart illustrating a process 90 for generating a snapshot request using the system of FIG. 1, in accordance with certain embodiments. The process 90 (and the other processes described herein) may be implemented by a hardware-based processor and may be machine-readable instructions stored on a tangible, non-transitory, machine-readable medium. In one embodiment, process 90 may be implemented by the content tuning/receiving hardware 18. In alternative embodiments, an independent snapshot capture and/or sharing device may be used to perform certain steps, while the content tuning/receiving hardware 18 may be used to perform other steps of the process 90.

The process 90 beings with receiving content (block 92). For example, as discussed above, the content may be provided by a content provider 12, such as a broadcaster 14 and/or a video-on-demand provider 16. The content may include video, audio, etc. and may be content that is live streamed or previously created.

Upon receiving the content, the content may be presented to the user (block 94). In some embodiments, the content may be presented after a particular time lapse. For example, digital video recording hardware and/or software may be used to record the content for playback at a later date.

Content tuning/receiving hardware 18 (or an independent snapshot capture and/or sharing device) may monitor for an indication that data capture (e.g., snapshotting) is desired by the user (decision block 96). For example, a particular infrared command code may be used to provide an indication that snapshotting is requested.

If no such indication is received, normal content playback (block 94) continues. However, in some embodiments, when such an indication is provided, the content tuning/receiving hardware 18 (or an independent snapshot capture and/or sharing device) may discern whether or not a snapshot timing indication has been provided (decision block 98). For example, certain inputs may indicate a duration of snapshot to capture. For example, in some embodiments, a user may hold down a button for the duration of time to capture. The amount of time the button is held down for may be used as the duration.

In situations where no timing indication is provided, a request for snapshot capture may be generated that uses a default duration (e.g., 6 seconds) (block 100). Otherwise, when a duration indication is provided, the snapshot capture request may include the indicated duration (block 102). In some embodiments, rather than providing a duration, a start and end time relative to the content playback may be used to capture the snapshot. Accordingly, these times may be presented in the snapshot capture request.

Additionally, a data constraint analysis may be completed. For example, constraints may limit attributes of the snapshot generation and/or sharing. For example, as will be discussed in more detail below, constraints may be placed on the snapshot generation, such as: a minimum snapshot duration, maximum snapshot duration, particular restricted portions of the content that may not be captured, particular data frames that should be added to the snapshot (e.g., a spoiler alert banner), etc. Further constraints may be placed on the sharing of particular snapshots, such as: restricted targets (e.g., social media sites where the snapshot cannot be posted), exclusive targets (e.g., a listing of social media sites where the snapshot can be posted), particular activities/functionalities to be invoked upon a share (e.g., provide reward points, track sharing, etc.), etc. A more detailed discussion of potential constraints will be discussed with regard to FIGS. 5-11 below.

The system may determine whether or not any data capture constraints are applicable to the current snapshot generation and/or sharing request (decision block 104). If no data capture and/or sharing constraints exist, the snapshot request may be provided without additional constraint (block 106). Otherwise, when constraints exist, the request may be provided in accordance with the data constraints (block 108). For example, the data constraints may be included in the provided request in some embodiments. Alternatively and/or additionally, the request parameters (e.g. start time, end time, duration, etc.) may be adjusted to accommodate the constraints. For example, if a constraint defines a maximum duration to be 5 seconds, but the requested duration is 10 seconds, the request may automatically be adjusted to the maximum duration of 5 seconds.

As mentioned above, the request is provided to one or more snapshot servers and/or services 28. Once the request is sent, normal operation may continue (e.g., block 94).

Snapshot Generation

Figure 3:
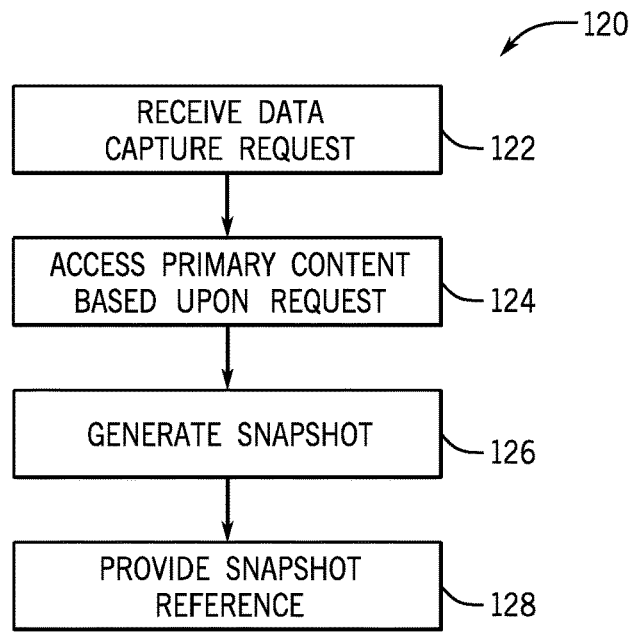
FIG. 3 is a flowchart illustrating generating, using system of FIG. 1, a snapshot and snapshot response in response to receiving a snapshot request, in accordance with certain embodiments.

Turning now to the snapshot generation process, the actual generation of the snapshots may occur independently from the electronic device where a request for creation of the snapshot is made. FIG. 3 is a flowchart illustrating a process 120 for generating a snapshot and snapshot response from a received snapshot request, in accordance with certain embodiments. Upon receiving a data capture request (e.g. as provided via process 90 of FIG. 2) (block 122), the primary content may be accessed (block 124). For example, as discussed above, the snapshot servers and/or services 28 may access the primary content 34 from internal and/or external content libraries 32 and/or 36. The received data capture request may include a content identifier and/or a content location identifier that may guide the snapshot server and/or services 28 to access the primary content.

Based upon the request, the snapshot servers and/or services 28 may know the snapshot generation parameters. For example, the start time, duration, and/or end time for the snapshot may be provided. Further, the constraints for snapshot generation may be included. Accordingly, the snapshot may be generated (block 126). In some embodiments, a subset of the primary content (e.g. from the start time for the duration provided in the data capture request and/or from the start time to the end time provided in the data capture request) may be broken up into separate PNG image files. These PNG image files may be combined into one animated GIF file. Alternatively, the subset of primary content may be stored as a compressed video, etc.

As discussed above, once the snapshot is generated, the snapshot (or a reference to the snapshot) may be provided, via a response message, to the device that requested the snapshot (block 128). In some embodiments, the snapshot will be stored in a data store and the response may contain a URL or other location indicator that points to the snapshot. In some embodiments, when multiple users request the same snapshot (or similar snapshots), the snapshot server and/or services 28 may generate one copy of the snapshot and provide a response to the multiple users with the same location identifier. Accordingly, each user may access the snapshot without generating multiple copies of the snapshot (or similar snapshots).

Snapshot Sharing

Figure 4:
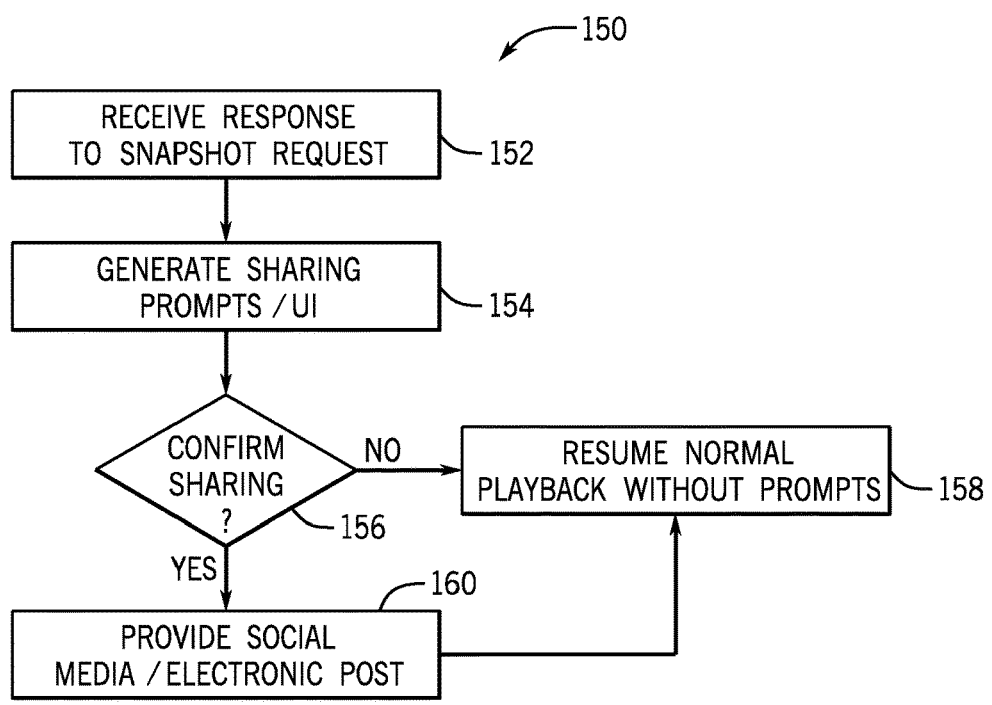
FIG. 4 is a flowchart illustrating sharing of generated snapshot, in accordance with certain embodiments.

Once the snapshot is generated, the electronic device that initiated the snapshot request may proceed with sharing the snapshot. FIG. 4 is a flowchart illustrating a process 150 for sharing generated snapshots, in accordance with certain embodiments. Upon receiving a snapshot response (e.g., from the snapshot server and/or services 28 as described in FIG. 3) (block 152), the content tuning/receiving hardware 18 (or an independent snapshot capture and/or sharing device) may prompts one or more sharing prompts and/or sharing graphical user interfaces (block 154). As will be discussed in more detail below, the sharing prompts may facilitate the sharing of the snapshot by enabling the user to provide additional information to facilitate sharing of the snapshot. For example, the user may view a preview of the snapshot, provide an indication of particular social media sites to share the snapshot to, confirm that the snapshot should be shared, etc.

In the current embodiment, the user may confirm sharing prior to any posts of the snapshot to social media sites. Accordingly, the system may determine whether or not the user has confirmed the sharing (decision block 156). When the user does not confirm the sharing (e.g., "cancels" the sharing), normal playback may resume (block 158). However, when the sharing is confirmed, the system (e.g., the content tuning/receiving hardware 18 (or an independent snapshot capture and/or sharing device)) may provide a post request to post the snapshot to specified social media platforms.

Further, while the current discussion primarily discusses social media platforms, it is important to note that the current techniques are not limited to posting to social media platforms. For example, the snapshot could be shared with other electronic devices (e.g., via short message service (SMS) text messages, electronic mail, etc.). Once the post request is sent, normal playback may resume (block 158).

Snapshot Generation and Sharing Constraints

Figure 5:
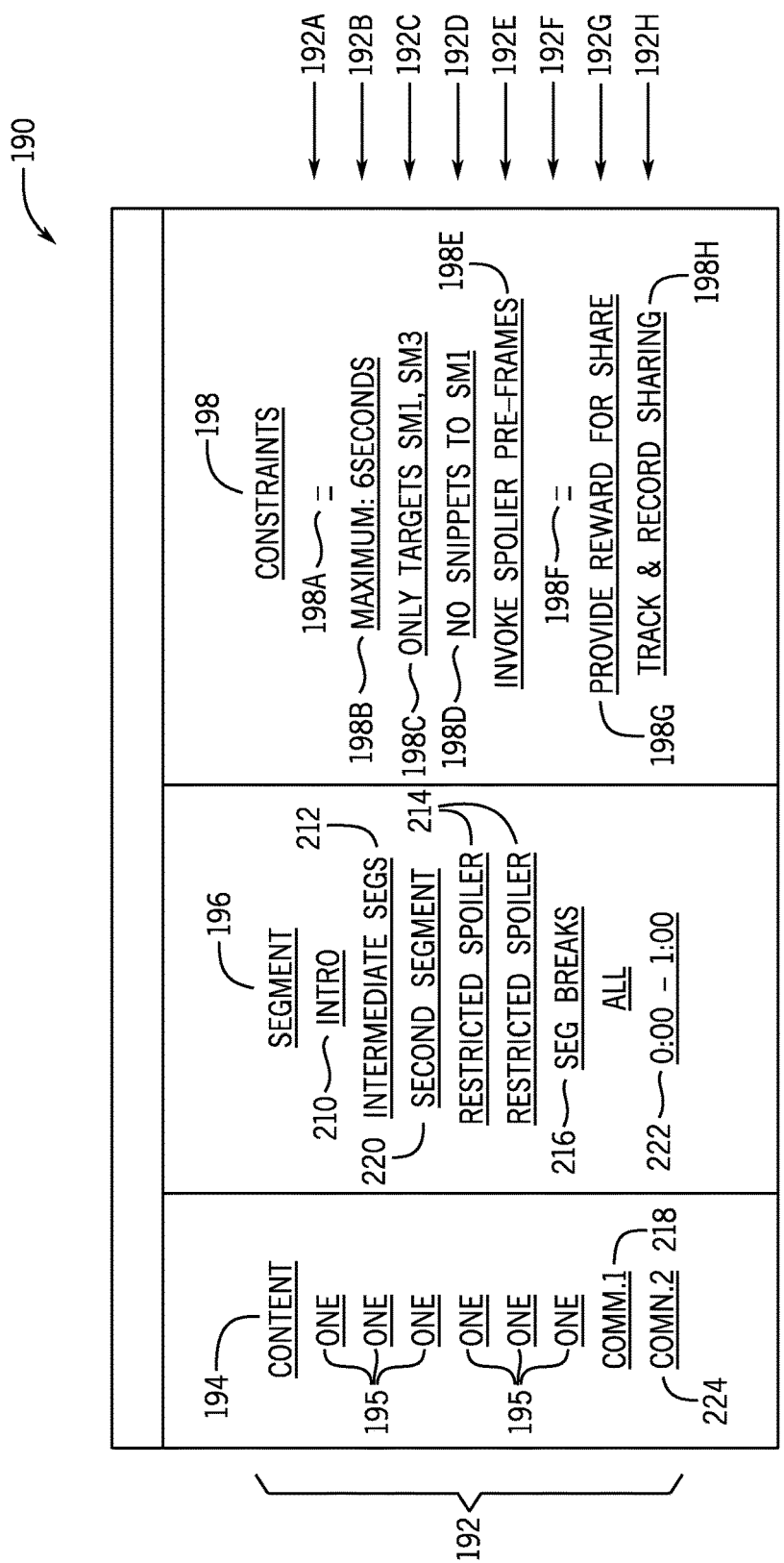
FIG. 5 is a schematic view of a tangible, non-transitory, machine-readable medium that includes one or more constraints associated with generation of snapshots of particular portions of particular content, in accordance with certain embodiments.
Figure 6:
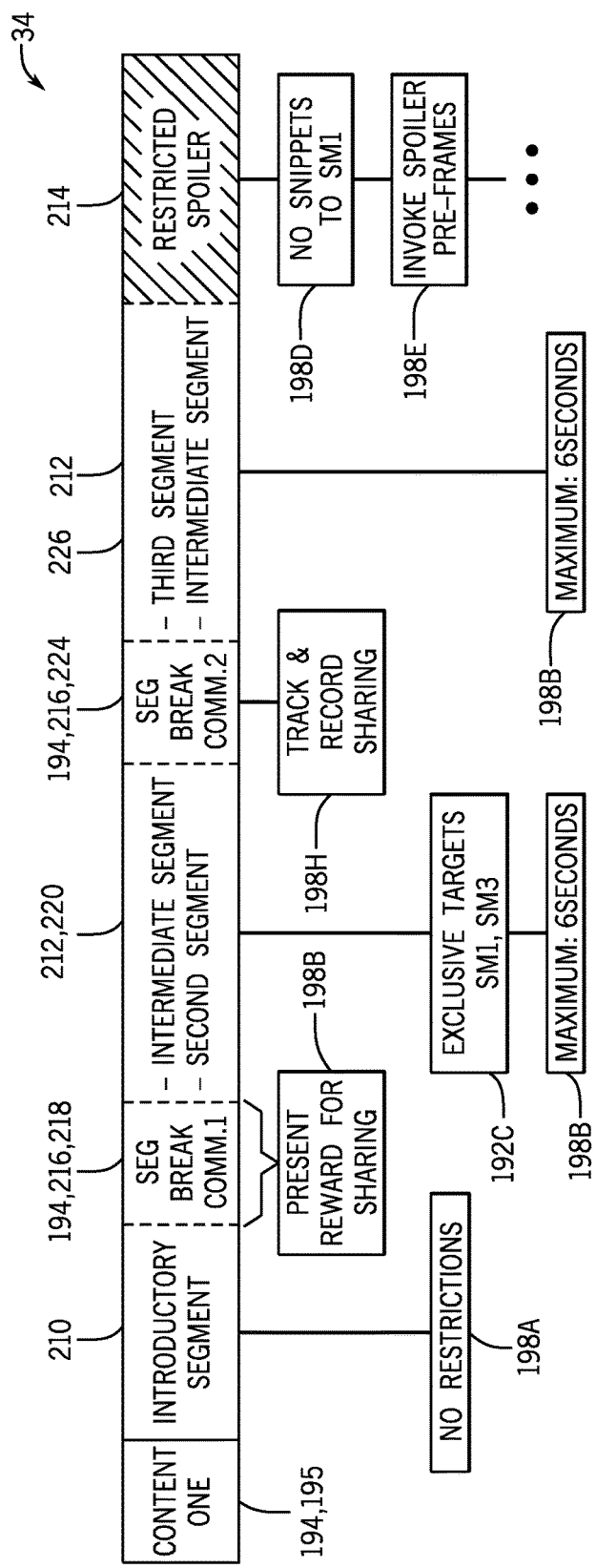
FIG. 6 is a schematic view of an example piece of primary content having associated constraints, in accordance with the example of FIG. 5.

As mentioned above, in some embodiments, it may be beneficial to add certain constraints to what and/or how snapshots are generated and/or shared. FIG. 5 is a schematic view of a tangible, non-transitory, machine-readable medium that includes one or more snapshot creation and/or sharing constraints, in accordance with certain embodiments. Additionally, FIG. 6 is a schematic view of an example piece of primary content having associated constraints, in accordance with the constraints stored in the machine-readable medium of FIG. 5. For clarity, FIGS. 5 and 6 will be discussed jointly.

Broadcasters and/or vendors may desire to place constraints on snapshot generation and/or sharing of their content and/or content related to their products. Accordingly, one or more constraints data stores 190 (e.g., database) may hold one or more constraints 192 for one or more pieces of primary content 34. In certain embodiments, the constraints 192 may include a content identifier 194, a segment identifier 196, and/or one or more constraint rules 198. The content identifier 194 may include an identifier of the content that may be mapped to the content identifier sent in the snapshot request 26 (of FIG. 1). Accordingly, the system 10 may determine constraints for a given piece of primary content by querying the content identifier 194.

It may be beneficial to enable more granular constraints. Accordingly, a segment identifier 196 may specify particular portions of the content that the associated constraint rule(s) 198 apply to. In some embodiments, the segments may be may be categorically defined. In the current example, constraints 192A, 192B, 192E, 192F, and 192G provide categorical segment definitions. For example, constraint 192A holds constraint rules 198 associated with introductory segments 210 (e.g., first segments, first 5 minutes, first 10 minutes, etc.) of content 194 (e.g., content 195) identified as "ONE." Constraint 192B holds constraint rules 198 associated with intermediate segments 212 (e.g., segments in between introductory segments 210 and spoiler segments 214, middle segments, middle 50%, etc.) of content 194 (e.g. content 195) identified as "ONE." Constraints 192E and 192F hold constraint rules 198 associated with spoiler sections 214 of the content (e.g., particular portions that may give away key plot elements, the last 5 minutes of the content, etc.) of content 194 (e.g. content 195) identified as "ONE." Constraint 192F holds constraint rules 198 associated with all segment breaks 216 (e.g., commercial blocks where primary content is not played, etc.) of content 194 identified as "ONE." Finally, constraint 192G holds constraint rules 198 associated with all of content 194 (e.g., content 218) identified as "COMM. 1."

Additionally and/or alternatively, the content segments 196 may be explicitly defined (e.g., by a segment identifier and/or timing identifier). Constraints 192C and 192H provide explicitly defined constraints 192. For example, constraint 192C holds constraint rules 198 associated with a segment 220 identified as "SECOND SEGMENT" of content 194 (e.g., content 195) identified as "ONE." Constraint 192H holds constraint rules 198 associated with a segment 222 timed 222 from 0:00 to 1:00 of content 194 (e.g., content 224) identified as "COMM.2."

In some embodiments, certain segments may be unconstrained. For example, no constraint rules apply in the constraints 192A and 192F, as indicated by NULL constraint rules 198A and 198F.

Alternatively, any number of constraints may be associated with content. For example, minimum snapshot sizes, maximum snapshot sizes, and/or banned capture periods may be applied to particular segments 196 of content 194. Constraint 192B provides a constraint rule 198B that indicates that the snapshot cannot exceed a maximum of 6 seconds. Constraint rule 198E indicates that spoiler pre-frames should be invoked for constraint 192E.

Additionally or alternatively, sharing constraints may be enforced in the system. Constraint rules 198C and 198D provide sharing constraints that constrain target sharing platforms. For example, constraint rule 198C indicates that snapshots associated with constraint 192C can only be shared to platforms SM1 and SM3. Constraint rule 198D indicates that snapshots associated with constraint 192D cannot be shared to platform SM1. In other words, constraint 192C provides an exclusive target constraint and constraint 192D provides a banned target constraint.

Additional activities may be triggered using the constraints 192. For example, constraints 192G and 192H trigger activities based upon sharing snapshots. For example, in constraint 192G, the constraint rule 198G provides a reward for sharing a snapshot associated with the constraint 192G. Constraint 192H includes a constraint rule 198H that triggers tracking and recording when a user shares a snapshot associated with constraint 192H.

In some embodiments, subject matter contained in particular segments may trigger certain constraints. For example, metadata of the primary content (e.g., information describing the content or adding supplemental information to the content) may indicate particular details that invoke certain constraints. For example, a watermark or other data marker may indicate when a copyright notification should occur based upon the particular portion of the primary content. In some embodiments, the metadata may indicate a particular logo or other trademark and/or copyrighted content. In some embodiments, the metadata may include a "point-to" location, such as a uniform resource locator (URL), which may provide a location for supplemental content related to the portion of primary content.

Upon detecting such metadata, constraints may be triggered. For example, in some embodiments, similar to the spoiler alert frames that are added to the introduction of a snapshot, copyright, trademark, and/or other notifications may be appended to the snapshot (e.g., append pre-frames). For example, a notification may be indicate that the clip is "Provided by" a particular content provider or vendor.

Additionally and/or alternatively, when a point-to location is provided in the metadata, a link to the location may be presented to viewers of the snapshot. Thus, when the snapshot is a commercial for XYZ product, for example, a link to XYZ's website may be presented in the snapshot.

In some embodiments, certain default constraints may be provided regardless of the identity of the primary content. For example, in some embodiments, a default constraint may indicate that all snapshots, regardless of the identity of primary content, should credit the snapshot provided. For example, pre-frames may be appended to the snapshot to credit a particular provider of the snapshot. For example, the vendor of the vendor of the device 18 may be credited, by providing a notification that the snapshot is "Provided by [vendor]."

Each of the constraints 192 may be associated with the primary content. FIG. 6 illustrates how these constraint rules 198 may be associated with the content 194. As illustrated, constraint rule 198A (e.g., no constraints) are associated with introductory segments 210 of content "ONE." Further, constraint rule 198G is associated with "ALL" of content "COMM. 1." Intermediate segments 212 are associated with the constraint rule 198B. Further, "SECOND SEGMENT" 220 is associated with constraint rule 192C. Content "COMM. 2" 224 is associated with constraint rule 198H. And lastly, the restricted spoiler section 214 is associated with constraint rules 198D and 198E.

In certain embodiments, when a snapshot duration causes a snapshot to enter a separate segment 196, the most restrictive constraint rules 198 may be applied to the entire snapshot. Alternatively, the user may be informed that certain options are only available for a portion of the snapshot and allow the user to select between shortening the snapshot, applying the most restrictive constraint rules 198 or modifying relevant settings of the snapshot as new segments 196 are reached. For example, in one embodiment a user may attempt to record a snapshot of a portion of the third segment 226 (an intermediate segment 212) that enters into the restricted spoiler segment 214. Of these segments 226 and 214, the only maximum set is 6 seconds in segment 226. There is no maximum set in segment 214. In some embodiments, because the most restrictive constraint rules 198 are selected between multiple segments, a 6 second maximum rule may be applied to segment 214. Additionally, segment 214 includes a ban to SM1 (constraint rule 198D). This may be applied to segment 226 because it is the most restrictive target rule of the two segments.

Figure 7:
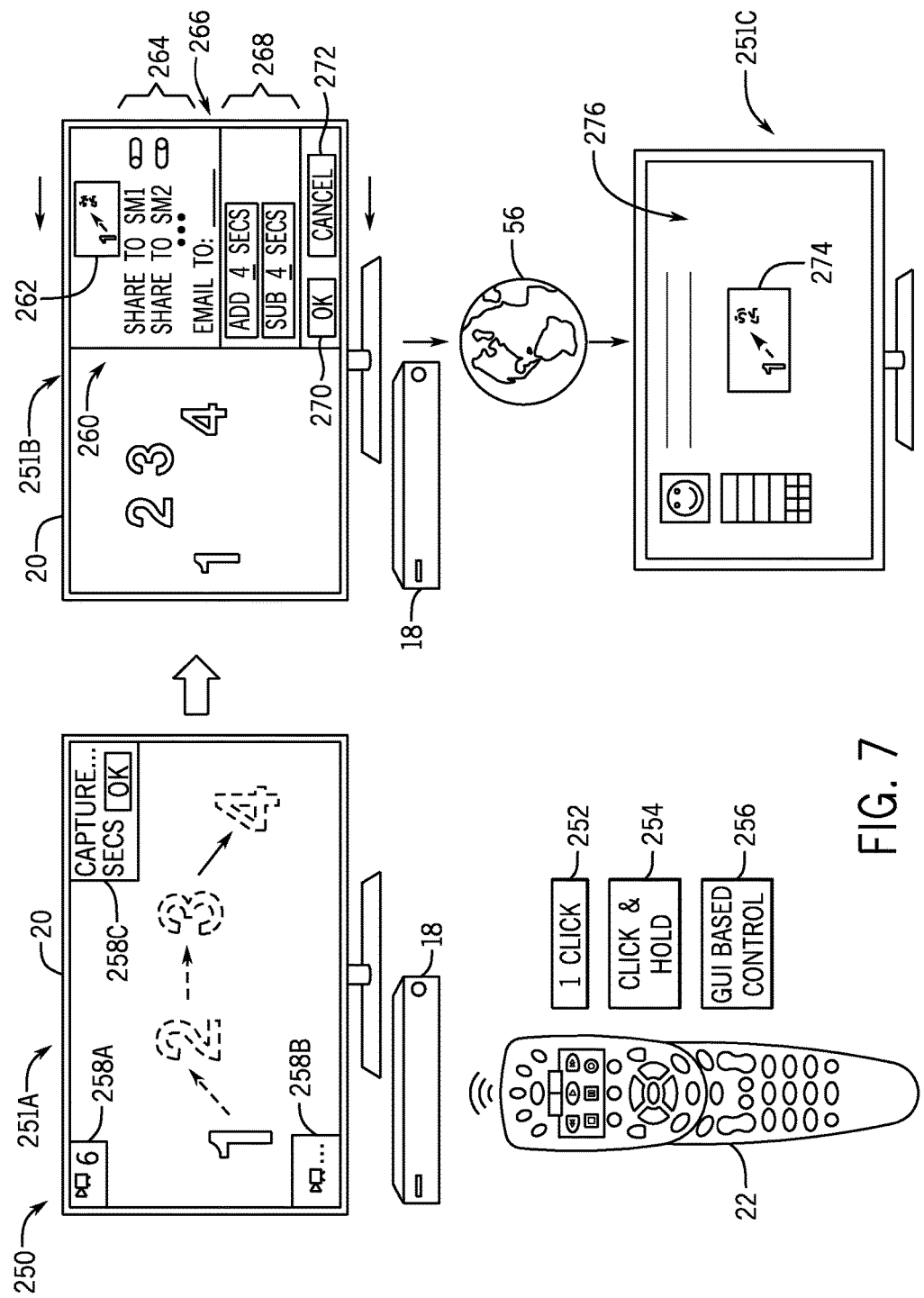
FIGS. 7-11 are schematic views illustrating a sequence of generating and sharing content according to the constraints described in FIGS. 5 and 6, in accordance with certain embodiments.

Continuing with the current example constraint rules 198, FIGS. 7-11 are schematic views illustrating a sequence of generating and sharing content according to the constraints 192 described in FIGS. 5 and 6, in accordance with certain embodiments. For example, FIG. 7 illustrates a basic flow 250 of snapshot generation and sharing, without associated constraints (e.g., of the introductory segments 210).

As illustrated in FIG. 7, a user input device 22 (e.g., a remote control) may be used to provide an indication that a snapshot is desired. This indication may be triggered by a single button click 252, a button click and hold 254 (e.g., where the hold may indicate the duration of the data capture), and/or a graphical user interface control input 256.

In certain embodiments, an indication may be presented on the playback device 20 that indicates data capture (e.g., snapshotting) is occurring. For example, in progression 251A, indicator 258A may indicate that a default capture of 6 seconds is being captured when a 1 click 252 operation (or other non-time indicating request) is initiated. Indicator 258B may indicate that a variable length data capture is occurring based upon a click and hold 254 operation (or other specified variable length data capture request) occurring. Indicator 258C may be provided as a GUI based prompt to allow the user to indicate a particular data capture duration when a GUI based control operation 256 (or other explicitly defined duration data capture request) occurring.

As illustrated in progression 251B, once the snapshot is generated and received (or a location indicator of the snapshot is received), one or more sharing prompts 260 may be presented. In the current embodiment, the sharing prompts 260 are provided in a sidebar that extends from the right of the screen.

In the current example, no constraints are associated with the current snapshot (e.g., because the snapshot occurred during the introductory segment 210. Thus, all available prompts 260 may be presented. Some available prompts 260 may include: a snapshot preview 262, one or more target social media platform prompts 264 that indicate particular social media platforms to share the snapshot to; other destination prompts 266 for sharing the snapshot to (e.g., email address prompt); editing prompts 268, such as a request to add a particular duration (e.g. 4 seconds) and/or subtract a particular duration (e.g., 4 seconds), and/or confirmation 270 and/or cancellation 272 prompts.

As illustrated by progression 251C, when the user confirms sharing by selecting the confirmation prompt 270, the snapshot 274 may be shared to the social media platform 56, such that the snapshot 274 becomes visible on the social media platform's graphical user interface 276.

Figure 8:
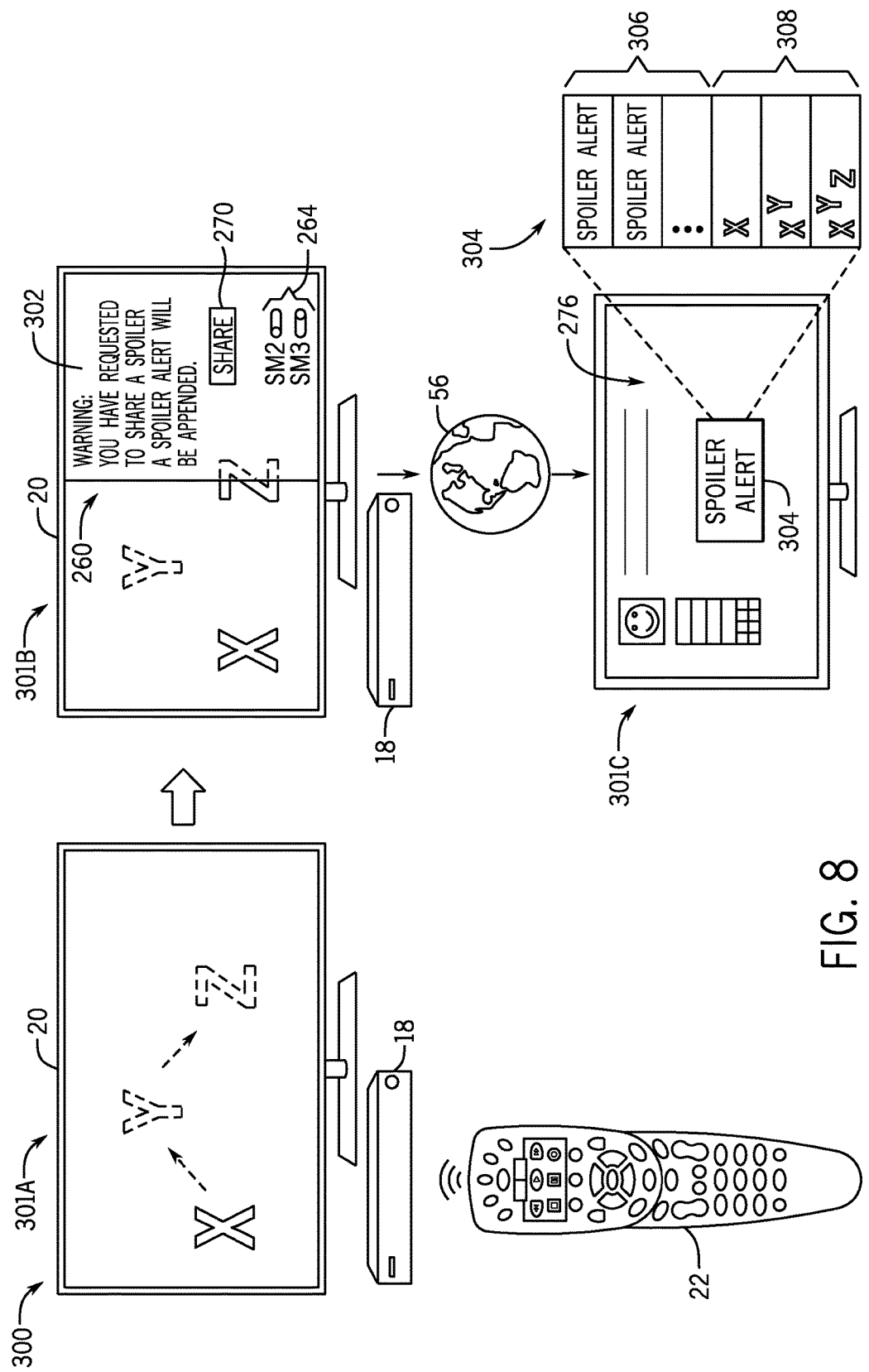

Turning now to other constraints, FIG. 8 illustrates an embodiment where spoiler alert handling and banned target constraints have been applied. In the example of FIG. 8, a snapshot request is initiated during the restricted spoiler 214 segment. Accordingly, the constraint rules 198D (banning sharing to social media platform SM1) and 198E (invoke spoiler pre-frames) are associated with the snapshot request. In progression 301A, the snapshot request is created and provided to the snapshot server and/or services 28. In the current embodiment, no indication of the screen capture request is provided. However, in alternative embodiments, indicators, such as 256A-C, may be provided to the user.

As illustrated in progression 301B, when the snapshot response is received, the sharing prompts 260 are presented. In the current embodiment, the user is provided a notice 302 that spoiler alert frames will be added to the snapshot because the user has captured spoiler segment 214 content. Further, because constraint rule 198D bans sharing to SM1, the SM1 is removed as a sharing option from the social media platform prompts 264. In some embodiments, banned options may be disabled and greyed out (or otherwise indicated as unavailable). Upon confirming the share via confirmation prompt 270, the altered snapshot 304 that includes the prepended spoiler alert frames 306 and the captured frames 308 is posted to the social media platform 56 and/or other target destinations (e.g. email, servers, and/or other electronic devices). Accordingly, the social media platform GUIs 276 may reflect the posted altered snapshot 304.

Figure 9:
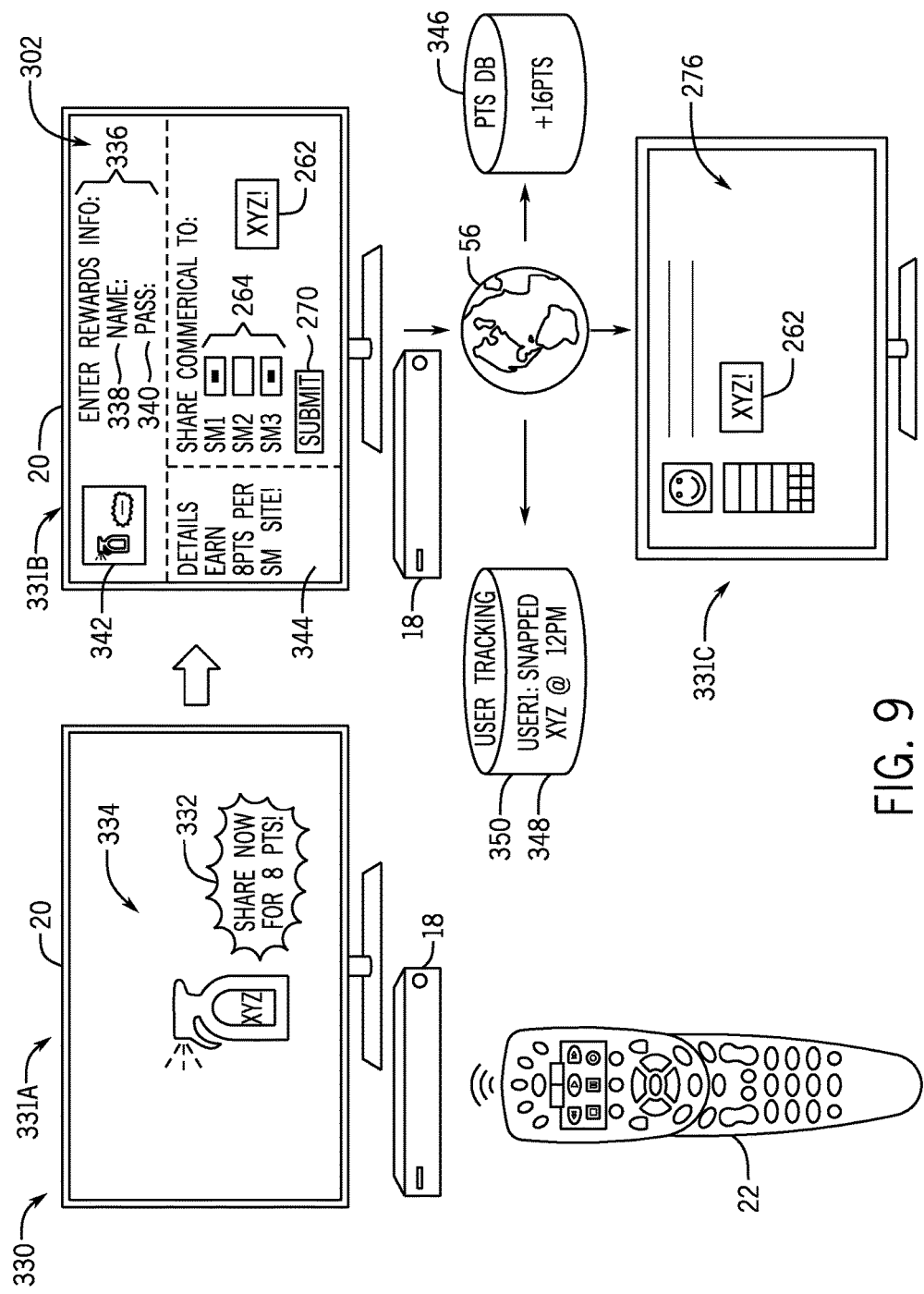

Snapshots of supplemental content may also be generated and shared. For example, FIG. 9 illustrates an embodiment 330 where a snapshot of a commercial may be generated and shared. Further, FIG. 9 illustrates additional constraints and/or activities that may be associated with the shared snapshot. For example, in certain embodiments, rewards points or other incentives may be offered for a user generating and sharing a commercial via their social media accounts (e.g., as illustrated in constraint 192G). Additionally and/or alternatively, tracking functionalities may be implemented (e.g., as illustrated in constraint 192H).

In certain embodiments, this incentive may be provided by notifying the user via the primary content. For example, in progression 331A, an indication 332 is presented in the content 334, which happens to be a commercial for product XYZ. The manufacturer of XYZ and/or the broadcaster of the commercial (e.g., content 334) may desire that users share the commercial on their social networking sites. Accordingly, the manufacturer of XYZ may provide the indication 332 as part of the content 334 and/or the broadcaster may provide the indication 332 as an overlay of the content 332. In some embodiments, no indicator 332 may be presented.

The user may initiate a request to generate and share the content 334 (e.g., via the user input device 22). Upon receiving a response that snapshot has been created and is ready for sharing, sharing prompts 302 may be presented to the user, as illustrated in progression 331B. In the current embodiment, because constraint rule 198G indicates that a reward should be provided for sharing the snapshot, the sharing prompts 302 may include Reward Information prompts 336, such as an account name 338 and/or a password 340. As discussed above, a snapshot preview 262 may also be provided. The primary content may continue to be shown (e.g., in a window 342). Further, detailed rewards rules 344 may be presented as well as particular social media platform prompts 264.

Upon confirming sharing (e.g., via the confirmation prompt 270), the snapshot may be provided to the social media platforms 56 (and any other target destinations), such that the content is presented in the GUI 276. Further, reward points (or other incentives) may be provided for the user. For example, in the current embodiment, the reward prompt information 336 is used to access an external reward points database 346 where the system may provide reward points for the user sharing the commercial content 334. For example, here the user is awarded 16 points (8 points for each of the two social media platforms that the user shared the content 334 to).

In certain embodiments, it may be beneficial to track users that share snapshots. For example, this information may be useful to gather demographics and/or other information of an audience that is particularly receptive to particular content. For example, as discussed above, constraint 192H triggers tracking of users that share the content "COMM. 2". Accordingly, if content 334 where "COMM. 2", the system could provide an user tracking data store 348 with an entry 350 that the particular user has shared the content 334 and/or a particular time and/or date of the sharing.

As previously discussed, some constraints relate to minimum and/or maximum timings allowed for a snapshot. FIG. 10 illustrates an embodiment 380 where maximum timing constraints have been applied. For example, the embodiment of FIG. 10 may relate to one of the intermediate segments 212 that have an associated 6 second maximum constraint rule 198B. During the progression 381A, the user may provide a timing indication 382 of 30 seconds (e.g., via the user input device 22 to the device 18).

Because the current snapshot is constrained by constraint rule 198B, the snapshot is limited to a 6 second maximum. In some embodiments, the first six seconds, last six seconds, middle six seconds, and/or most commonly snapshotted six seconds may be used to automatically select six seconds from the 30 seconds requested by the user. However, in other embodiments, the user may be allowed to select a particular six second interval to share. For example, in progression 381B, the user is presented sharing prompts 260 that provide an interface 384 for selecting a six second interval of the thirty seconds requested by the user. Upon selection of the interval and confirmation of the share (e.g., via the confirmation prompt 270, the six second snapshot is posted to the applicable targets (e.g. social media platforms 56), such that the social media platform GUIs 276 may present the six second snapshot 386.

In some embodiments, it may be beneficial to provide exclusive posting rights to certain targets. FIG. 11 illustrates an embodiment 400 where exclusive target constraints have been applied. In progression 401A, the user may request a snapshot (e.g., via user input device 22) during the "SECOND SEGMENT" 220 of FIGS. 5 and 6. As previously discussed, this segment is associated with constraint rule 198C, which provides an exclusive right to share content snapshots of this segment 220 with social media platforms SM1 and SM3. Accordingly, as illustrated in progression 401B, the sharing prompts 260, which include a snapshot preview 262, target social media platform prompts 264, confirmation prompts 270 and/or cancellation 272 prompts, has a disabled social media platform prompt 264'. Thus, the user is unable to select this option for sharing, because of the exclusivity constraint placed upon "SECOND SEGMENT" snapshots.

However, the user is able to share to the exclusive targets. For example, upon confirming the sharing via the confirmation prompt 270, the snapshot 402 is posted to the selected exclusive targets (e.g., social media platform 52 SM1). Thus, the snapshot 402 may be presented by the target (e.g., the social media platform GUI 276).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An electronic device, comprising:
    a processor configured to:
        receive and play digital content;
        detect a request to capture a portion of the digital content by detecting selection of a single button of a remote control;
        determine at least two of a start time of the portion of the digital content, a duration of the portion of the digital content, and an end time of the portion of the digital content, based upon the selection of the single button;
        provide a snapshot generation request to a snapshot generation service, wherein the snapshot generation request comprises: an identifier of the digital content, the determined start time of the portion of the digital content, the determined duration of the portion of the digital content, the determined end time of the portion of the digital content, or any combination thereof;
        receive a snapshot generation response, the snapshot generation response comprising: a snapshot associated with the portion of the digital content, a location identifier associated with a location where the snapshot may be accessed, or both;
        present one or more sharing prompts via a display, upon receiving the snapshot generation response;
        present one or more snapshot editing prompts as one of the one or more sharing prompts;

edit the snapshot prior to providing a post request, in accordance with the one or more snapshot editing prompts, wherein the one or more snapshot editing prompts is configured to add additional content duration to the snapshot, remove content duration from the snapshot, or both; and provide the post request to request posting of the snapshot to one or more sharing targets.

2. The electronic device of claim 1, wherein the processor is configured to:

provide the snapshot generation request via an application programming interface of the snapshot generation service.

3. The electronic device of claim 1, wherein the selection of the single button of the remote control comprises pressing and releasing the single button, and the start time of the portion of the digital content is determined based upon when the single button of the remote control is pressed and the duration of the portion of the digital content is a default duration.

4. The electronic device of claim 1, wherein the selection of the single button comprises pressing, holding down, and releasing the single button of the remote control, and the start time of the portion of the digital content is determined based upon when the single button of the remote control is pressed and the duration of the portion of the digital content is determined based upon how long the single button of the remote control is held down.

5. The electronic device of claim 1, wherein the processor is configured to:

present a confirmation prompt as one of the one or more sharing prompts; and provide the post request only after receiving an affirmative indication regarding the confirmation prompt.

6. The electronic device of claim 1, wherein the processor is configured to:

provide an indication that data capture is occurring after detecting the request to capture the portion of the digital content.

7. The electronic device of claim 1, wherein the processor is configured to:

determine one or more snapshot generation constraints, snapshot sharing constraints, or both associated with the portion of the digital content; and provide the snapshot generation request in accordance with the one or more snapshot generation constraints, snapshot sharing constraints, or both.

8. The electronic device of claim 1, wherein the processor is configured to:

determine one or more snapshot generation constraints, snapshot sharing constraints, or both associated with the portion of the digital content; and provide the post request in accordance with the one or more snapshot generation constraints, snapshot sharing constraints, or both.

9. An electronic device, comprising:

a processor configured to:

receive a snapshot generation request, wherein the snapshot generation request is based on a selection of a single button of a remote control, wherein the snapshot generation request comprises: an identifier of digital content playing at a source of the snapshot generation request and at least two of a start time of a portion of the digital content, a duration of the portion of the digital content, and an end time of the portion of the digital content, determined based upon the selection of the single button of the remote control;

in response to receiving the snapshot generation request:

generate a snapshot; and provide a snapshot generation response, the snapshot generation response comprising: the snapshot associated with the portion of the digital content, a location identifier associated with a location where the snapshot may be accessed, or both;

present one or more sharing prompts via a display, upon receiving the snapshot generation response;

present one or more snapshot editing prompts as one of the one or more sharing prompts;

edit the snapshot prior to providing a post request, in accordance with the one or more snapshot editing prompts, wherein the one or more snapshot editing prompts is configured to add additional content duration to the snapshot, remove content duration from the snapshot, or both.

10. The electronic device of claim 9, wherein the processor is configured to:

access a copy of the digital content from a content library using an identifier;

pinpoint a portion of the copy using the start time, the duration, the end time or any combination thereof;

split the portion of the copy by segmenting the portion of the copy into individual files; and combine the individual files into an animated file to generate the snapshot.

11. The electronic device of claim 9, wherein the processor is configured to:

upon generation of the snapshot, store the snapshot is a location of a snapshot data store; and provide a reference to the location of the snapshot data store in the snapshot generation response, without providing the actual snapshot in the snapshot generation response.

12. The electronic device of claim 11, wherein the reference to the location comprises a uniform resource locater (URL).

13. The electronic device of claim 9, wherein the processor is configured to:

determine one or more snapshot generation constraints, snapshot sharing constraints, or both associated with the portion of the digital content; and generate the snapshot in accordance with the one or more snapshot generation constraints, snapshot sharing constraints, or both.

14. The electronic device of claim 9, wherein the processor is configured to:

determine one or more snapshot generation constraints, snapshot sharing constraints, or both associated with the portion of the digital content; and provide the snapshot generation response in accordance with the one or more snapshot generation constraints, snapshot sharing constraints, or both.

15. A tangible, non-transitory, machine-readable medium, comprising instructions to:

receive a snapshot generation response to a snapshot generation request, wherein the snapshot generation request is generated via selection of a single button of a remote control, wherein at least two of a start time of the snapshot, a duration of the snapshot, and an end time of the snapshot are determined based upon the selection of the single button, and wherein the snapshot generation response comprises: the snapshot associated with a portion of digital content playing at a source of the snapshot generation request, a location identifier associated with a location where the snapshot may be accessed, or both;

present one or more sharing prompts via a display, upon receiving the snapshot generation response, wherein the sharing prompts are configured to at least confirm that the snapshot should be shared;

present one or more snapshot editing prompts as one of the one or more sharing prompts;

edit the snapshot prior to providing a post request, in accordance with the one or more snapshot editing prompts, wherein the one or more snapshot editing prompts is configured to add additional content duration to the snapshot, remove content duration from the snapshot, or both; and share the snapshot upon receiving confirmation, via the sharing prompts, that the snapshot should be shared.

16. The machine-readable medium of claim 15, comprising instructions to:
determine one or more snapshot generation constraints, snapshot sharing constraints, or both associated with the portion of the digital content; and
present the one or more sharing prompts in accordance with the one or more snapshot generation constraints, snapshot sharing constraints, or both.

17. The machine-readable medium of claim 15, comprising instructions to:
determine that at least one or more snapshot generation constraints, snapshot sharing constraints, or both associated with the portion of the digital content comprises a constraint to invoke spoiler pre-frames; and
present a notification that spoiler alert pre-frames will be added to the snapshot.

18. The machine-readable medium of claim 15, comprising instructions to:
determine that at least one or more snapshot generation constraints, snapshot sharing constraints, or both associated with the portion of the digital content comprises a constraint to limit a duration of the snapshot to a maximum duration; and
present a sharing prompt that enables selection of a particular portion in accordance with the maximum duration.

19. The machine-readable medium of claim 15, comprising instructions to:
determine that at least one or more snapshot generation constraints, snapshot sharing constraints, or both associated with the portion of the digital content comprises a constraint to limit sharing of the snapshot to one or more particular targets; and
present a sharing prompt that enables selection of only targets that are the particular targets.

20. The machine-readable medium of claim 15, comprising instructions to:
determine that at least one or more snapshot generation constraints, snapshot sharing constraints, or both associated with the portion of the digital content comprises a constraint to present a notification based upon metadata of the digital content; and
present the notification in the snapshot.

21. The machine-readable medium of claim 15, comprising instructions to:
determine that at least one or more snapshot generation constraints, snapshot sharing constraints, or both comprises a default constraint to be applied to all snapshots regardless of an identity of the digital content; and
present the snapshot in accordance with the default constraint.

* * * * *